United States Patent
Jin

(10) Patent No.: US 10,572,040 B2
(45) Date of Patent: Feb. 25, 2020

(54) TOUCH DISPLAY PANEL AND TOUCH DISPLAY DEVICE

(71) Applicants: Shanghai AVIC OPTO Electronics Co., Ltd., Shanghai (CN); Tianma Micro-Electronics Co., Ltd., Shenzhen (CN)

(72) Inventor: Huijun Jin, Shanghai (CN)

(73) Assignees: Shanghai AVIC OPTO Electronics Co., Ltd., Shanghai (CN); Tianma Micro-Electronics Co., Ltd., Shenzhen (CN)

( * ) Notice: Subject to any disclaimer, the term of this patent is extended or adjusted under 35 U.S.C. 154(b) by 0 days.

(21) Appl. No.: 15/464,292

(22) Filed: Mar. 20, 2017

(65) Prior Publication Data

US 2017/0192575 A1 Jul. 6, 2017

(30) Foreign Application Priority Data

Oct. 28, 2016 (CN) .......................... 2016 1 0970708

(51) Int. Cl.
*G06F 3/041* (2006.01)
(52) U.S. Cl.
CPC .......... *G06F 3/0412* (2013.01); *G06F 3/0416* (2013.01)
(58) Field of Classification Search
CPC ............................. G06F 3/0412; G06F 3/0416
See application file for complete search history.

(56) References Cited

U.S. PATENT DOCUMENTS

| | | | | |
|---|---|---|---|---|
| 2011/0169759 A1* | 7/2011 | Wang | .................... | G06F 3/0416 345/173 |
| 2015/0116263 A1* | 4/2015 | Kim | ........................ | G06F 3/044 345/174 |
| 2015/0228706 A1* | 8/2015 | Lee | ........................ | G02F 1/1368 257/88 |
| 2015/0268759 A1* | 9/2015 | Ludden | .................... | G06F 3/044 345/174 |
| 2016/0291777 A1* | 10/2016 | Xi | ........................... | G06F 3/0416 |
| 2017/0090624 A1* | 3/2017 | Kwon | .................... | G06F 3/0416 |
| 2018/0059855 A1* | 3/2018 | Gwon | .................... | G06F 3/0412 |

FOREIGN PATENT DOCUMENTS

CN 104849895 A 8/2015

* cited by examiner

*Primary Examiner* — Kwang-Su Yang
(74) *Attorney, Agent, or Firm* — Kilpatrick Townsend & Stockton, LLP

(57) ABSTRACT

A touch display panel is provided. The touch display panel includes multiple data lines and multiple scanning lines arranged in a display region on a first side of a first substrate; multiple touch electrodes arranged in the display region on the first side of the first substrate and touch electrode wires electrically connected to the touch electrodes; multiple data line pins and multiple touch electrode pins arranged in a border region on the first side of the first substrate; and first connection wires and second connection wires arranged in the border region on the first side of the first substrate. The first connection wires electrically connect the touch electrode pins and the touch electrode wires, and the second connection wires electrically connect the data line pins and the data lines. A touch display device is further provided, which includes the touch display panel.

15 Claims, 7 Drawing Sheets

TOUCH DISPLAY PANEL AND TOUCH DISPLAY DEVICE

CROSS REFERENCE OF RELATED APPLICATION

This application claims the priority to Chinese Patent Application No. 201610970708.9, entitled "TOUCH DISPLAY PANEL AND TOUCH DISPLAY DEVICE", filed with the Chinese State Intellectual Property Office on Oct. 28, 2016, which is incorporated herein by reference in its entirety.

FIELD

The present disclosure relates to the technical field of touch display, and in particular to a touch display panel and a touch display device including the same.

BACKGROUND

With development of touch and display technology, a display panel integrated with a touch function (i.e., a touch display panel) is increasingly widely applied. Presently, the touch display panel includes a display region and a border region which is arranged around the display region and encloses the display region. In the display region, it is arranged display driving wires and touch driving wires, and in the border region, it is arranged a display driving circuit and a touch driving circuit, and display connection wires connecting the display driving circuit and the display driving wires and touch connection wires connecting the touch driving circuit and the touch driving wires. The touch connection wires are divided into two groups arranged oppositely on two sides of the display connection wires, thereby resulting in that a distance between adjacent touch connection wires is short and short circuit takes place easily.

SUMMARY

In order to solve the technical problem described above, a touch display panel is provided according to an embodiment of the present invention, for reducing a probability that first connection wires electrically connected to adjacent touch electrode pins in the touch display panel are shorted.

In order to solve the above problem, the following technical solutions are provided according to embodiments of the present invention.

A touch display panel is provided. The touch display panel includes a display region and a border region. The touch display panel includes a first substrate, and multiple data lines and multiple scanning lines which are arranged in the display region on a first side of the first substrate and are arranged to be insulatively intersected with each other. The multiple data lines and the multiple scanning lines define multiple display pixels. The touch display panel further includes multiple touch electrodes arranged in the display region on the first side of the first substrate and touch electrode wires electrically connected to the touch electrodes. The touch display panel further includes multiple first pins arranged in the border region on the first side of the first substrate. The multiple first pins include multiple data line pins and multiple touch electrode pins. The touch display panel further includes first connection wires and second connection wires arranged in the border region on the first side of the first substrate. The first connection wires electrically connect the touch electrode pins and the touch electrode wires and the second connection wires electrically connect the data line pins and the data lines. The touch electrode pins are arranged in different rows from the data line pins.

A touch display device is provided, which includes the touch display panel described above.

BRIEF DESCRIPTION OF THE DRAWINGS

In order to illustrate technical solutions in embodiments of the present invention the conventional technology more clearly, drawings for the description of the embodiments or the conventional technology are introduced simply hereinafter. Apparently, the drawings described in the following only describe some embodiments of the present invention. Other drawings may be obtained according to these drawings by those skilled in the art without any creative work.

DETAILED DESCRIPTION OF EMBODIMENTS

Hereinafter technical solutions in embodiments of the present invention are described clearly and completely in conjunction with drawings in the embodiments of the present invention. Apparently, the described embodiments are only some rather than all of embodiments of the present invention. Any other embodiments obtained based on the embodiments of the present invention by those skilled in the art without any creative work fall within the scope of protection of the present disclosure.

Many specific details are clarified in the following description to make the present disclosure being understood thoroughly, but the present disclosure may be implemented by other manners different from that described here. Those skilled in the art may make similar extension without departing the connotation of the present disclosure, and therefore the present disclosure is not limited by specific embodiments disclosed in the following.

Figure 1:
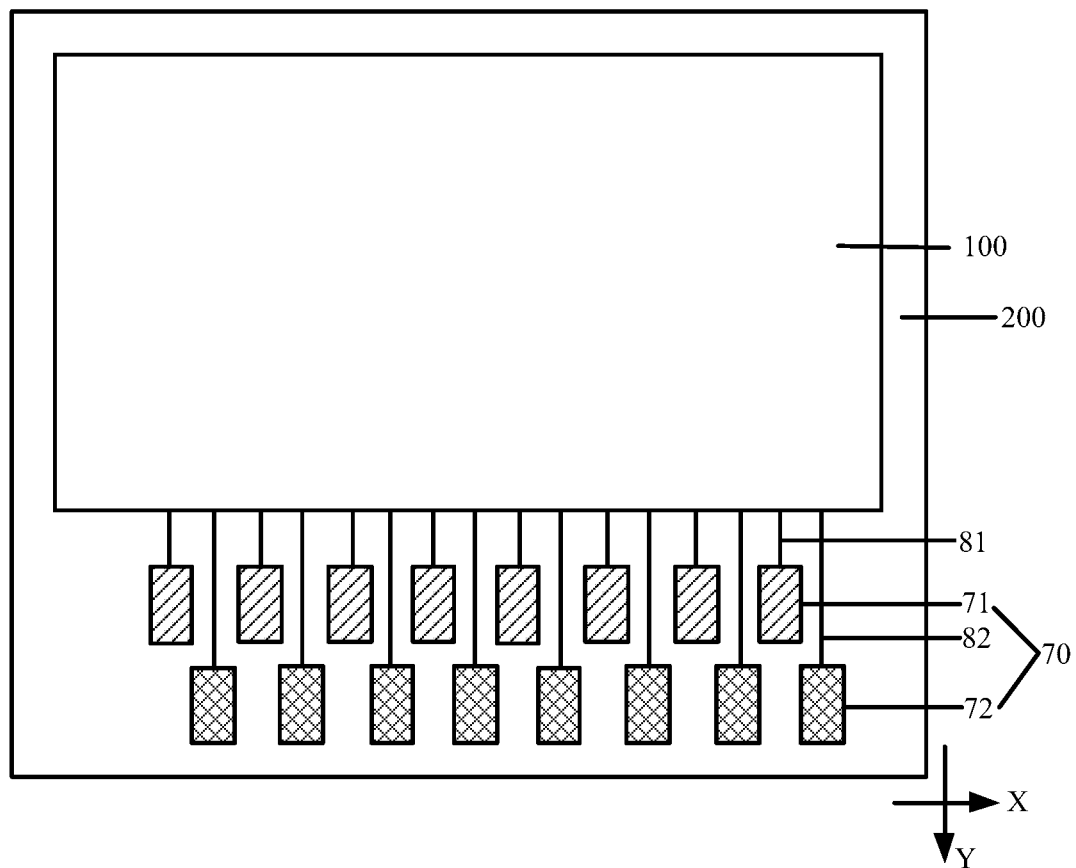
FIG. 1 is a schematic structural diagram of a touch display panel according to an embodiment of the present invention.
Figure 2:
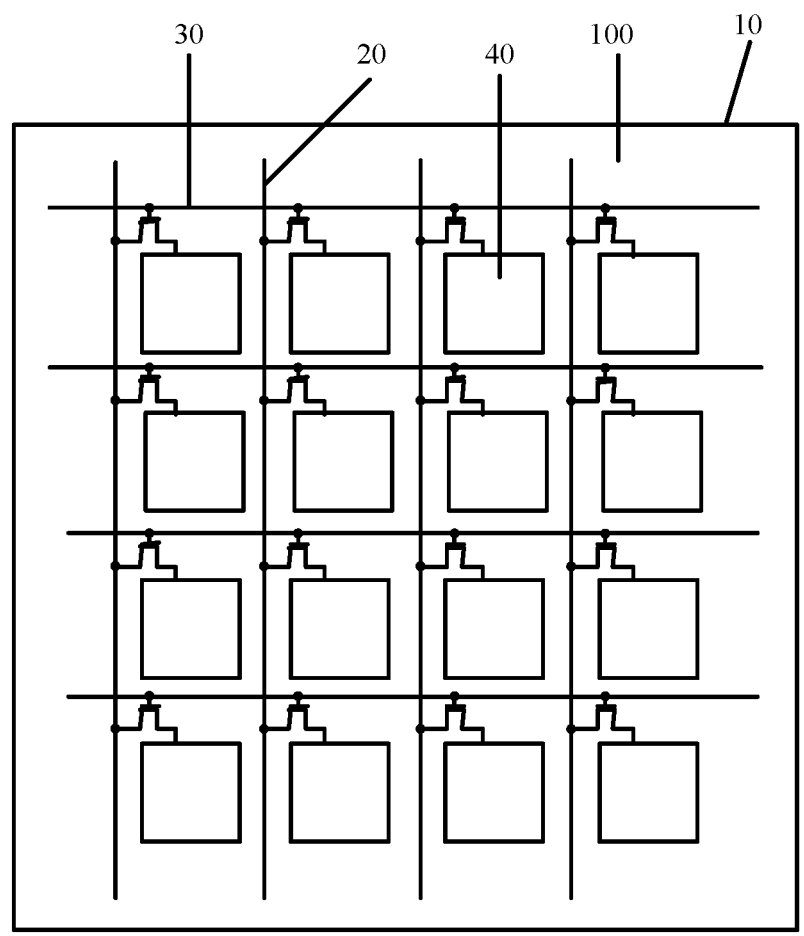
FIG. 2 is a plan view of display pixels in the touch display panel shown in FIG. 1.
Figure 3:
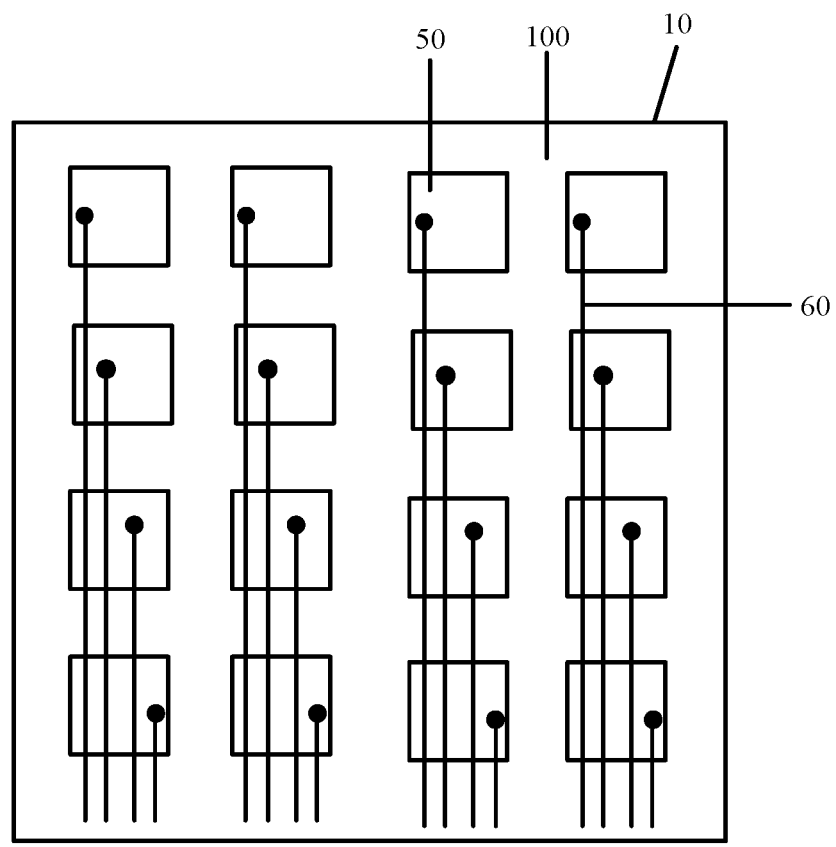
FIG. 3 is a plan view of touch electrodes in the touch display panel shown in FIG. 1.

Referring to FIGS. 1 to 3, FIG. 1 is a schematic structural diagram of a touch display panel according to an embodiment of the present invention, FIG. 2 is a plan view of display pixels in the touch display panel shown in FIG. 1, and FIG. 3 is a plan view of touch electrodes in the touch display panel shown in FIG. 1. In an embodiment of the present invention, in a direction parallel to a surface of the touch display panel, the touch display panel includes a display region 100 and a border region 200. In a direction perpendicular to the surface of the touch display panel, the touch display panel includes a first substrate 10. In the direction perpendicular to the surface of the touch display panel, the touch display panel further includes multiple data lines 20 and multiple scanning lines 30 which are arranged in the display region 100 on a first side of the first substrate 10 and are arranged to be insulatively intersected with each other. The multiple data lines 20 and the multiple scanning lines 30 define multiple display pixels 40. In the direction perpendicular to the surface of the touch display panel, the touch display panel further includes multiple touch electrodes 50 arranged in the display region 100 on the first side of the first substrate 10 and touch electrode wires 60 electrically connected to the touch electrodes 50. In the direction perpendicular to the surface of the touch display panel, the touch display panel further includes multiple first pins 70 arranged in the border region 200 on the first side of the first substrate 10. The multiple first pins 70 include multiple touch electrode pins 71 and multiple data line pins 72. In the direction perpendicular to the surface of the touch display panel, the touch display panel further includes first connection wires 81 and second connection wires 82 arranged in the border region 200 on the first side of the first substrate 10. The first connection wires 81 electrically connect the touch electrode pins 71 and the touch electrode pins 60 and the second connection wires 82 electrically connect the data line pins 72 and the data lines 20. The touch electrode pins 71 are arranged in different rows from the data line pins 72, such that a distance between adjacent touch electrode pins is increased without increasing a length in a row direction X in the border region and without increasing the number of the touch electrode pins, thereby increasing a distance between the first connection wires electrically connected to adjacent touch electrode pins, and reducing a probability that the first connection wires electrically connected to the adjacent touch electrode pins are shorted.

Based on the above embodiment, in an embodiment of the present disclosure, the touch display panel further includes a drive circuit (not shown in the figure) arranged in the border region on the first side of the first substrate. The drive circuit includes a signal unit and multiple second pins. There is a one-to-one correspondence between the multiple second pins and the multiple first pins. The signal unit includes a display driving circuit configured to provide data signals to the data lines and a touch driving circuit configured to provide touch signals to the touch electrode wires. Some of the multiple second pins are configured to electrically connect the data line pins and the display driving unit, and transmit the drive signal provided by the display driving unit to the data line pins; and some of the multiple second pins are configured to electrically connect the touch electrode pins and the touch driving unit, and transmit the drive signal provided by the touch driving unit to the touch electrode pins.

Based on the above embodiments, in an embodiment of the present invention, in a column direction Y perpendicular to the row direction X, projections of the touch electrode pins do not completely overlap with projections of the data line pins, so as to avoid mutual influence between the first connection wires electrically connected to the touch electrode pins and the second connection wires electrically connected to the data line pins due to a too short distance between the first connection wires and the second connection wires.

Figure 4:
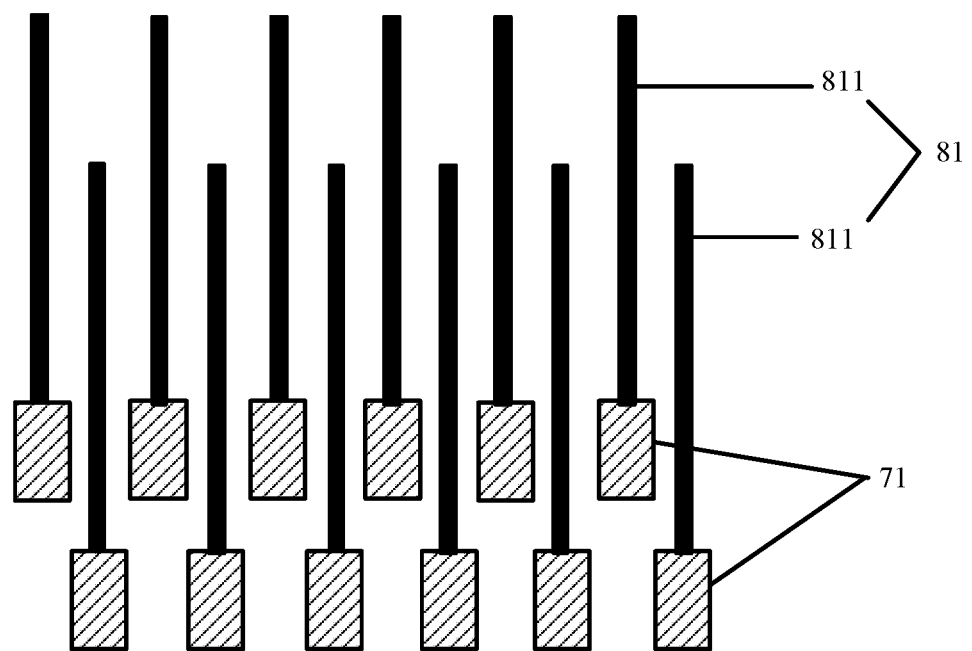
FIG. 4 is a plan view of touch electrode pins and first connection wires electrically connected thereto in a touch display panel according to an embodiment of the present invention.
Figure 5:
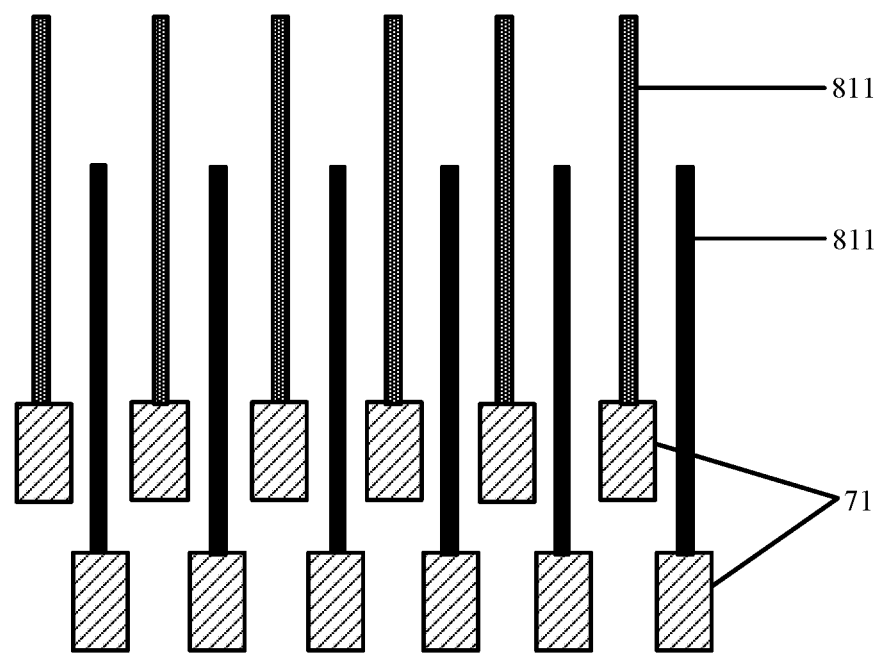
FIG. 5 is a plan view of touch electrode pins and first connection wires electrically connected thereto in a touch display panel according to another embodiment of the present invention.

Referring to FIG. 4 and FIG. 5, FIG. 4 and FIG. 5 respectively show a plan view of touch electrode pins 71 and first connection wires 81 electrically connected to the touch electrode pins 71 according to two embodiments of the present invention. In an embodiment of the present invention, the multiple touch electrode pins 71 are grouped into N rows, and the touch electrode pins in a same row are arranged in parallel in the row direction. The first connection wires 81 include N groups of first sub-connection wires 811, and one group of first sub-connection wires 811 are electrically connected to one row of touch electrode pins 71, where N is a positive integer not less than 1, such as 1, 2 and 3. Optionally, N is a positive integer not less than 2. The multiple touch electrode pins are arranged in different rows, such that a distance between adjacent touch electrode pins in the same row is increased without increasing the length in the row direction in the border region and without increasing the number of the touch electrode pins.

Similarly, the multiple data line pins are grouped into M rows, and the data line pins in a same row are arranged in parallel in the row direction. The second connection wires include M groups of second sub-connection wires, and one group of second sub-connection wires are electrically connected to one row of data line pins, where M is a positive integer not less than 1, such as 1, 2, 3 and 4. Optionally, M is a positive integer not less than 2. The multiple data line pins are arranged in different rows, such that a distance between adjacent data line pins in the same row is increased without increasing the length in the row direction in the border region and without increasing the number of the data line pins.

Figure 6:
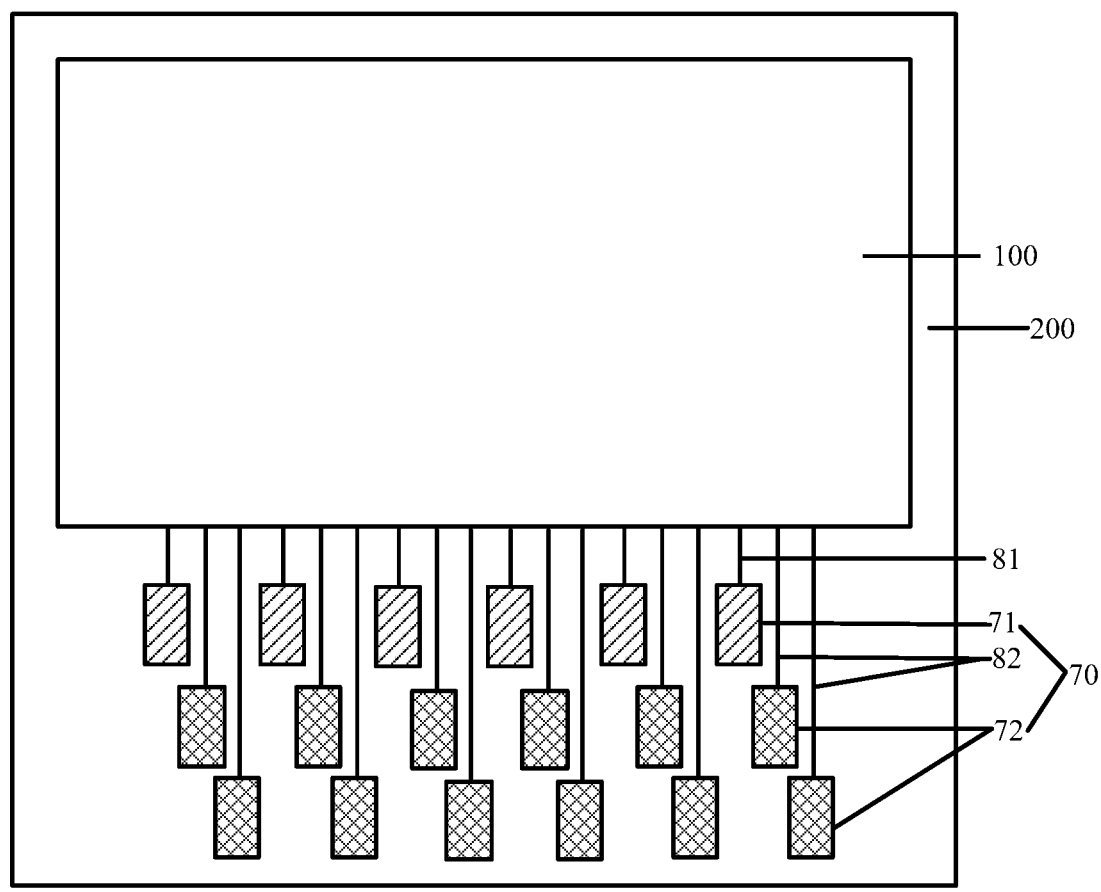
FIG. 6 is a schematic structural diagram of a touch display panel according to another embodiment of the present invention.

It should be noted that, in an embodiment of the present invention, the number of the groups of the first sub-connection wires included in the first connection wires may be the same as or different from the number of the groups of the second sub-connection wires included in the second connection wires, as shown in FIG. 1 and FIG. 6 respectively. That is, M may be the same as or different from N depending on specific cases. In an alternative embodiment of the present invention, since the number of touch electrodes is generally less than the number of data lines in the touch display panel, the number of the groups of the first sub-connection wires included in the first connection wires may be set to be less than the number of the groups of the second sub-connection wires included in the second connection wires, i.e., the number of the rows of the touch electrode pins is less than the number of the rows of the data line pins. For example, the touch display panel may include one row of touch electrode pins 71 and two rows of data line pins 72, as shown in FIG. 6.

Based on the above embodiments, in an embodiment of the present invention, a same group of first sub-connection wires are arranged in a same layer; and similarly, a same group of second sub-connection wires are arranged in a same layer, so as to simplify a process for fabricating the touch display panel. This is not intended to be limiting, and the present disclosure will be implemented as appropriate.

Based on the above embodiments, in an embodiment of the present invention, at least one group of first sub-connection wires are arranged in a same layer as the touch electrode wires. In another embodiment of the present invention, at least one group of first sub-connection wires are arranged in a same layer as the data lines. In another embodiment of the present invention, at least one group of first sub-connection wires are arranged in a same layer as the scanning lines, so as to further simplify the process for fabricating the touch display panel and reduce a thickness of the resulting touch display panel.

It should be noted that, in a case that the first connection wires 81 include at least two groups of first sub-connection wires 811, different groups of first sub-connection wires 811 may be arranged in a same layer to simplify the process for fabricating the touch display panel, as shown in FIG. 4. Alternatively, different groups of first sub-connection wires 811 may be arranged in different layers, as shown in FIG. 5. In this case, the multiple touch electrode pins are arranged in different layers, such that a distance between adjacent touch electrode pins in the same layer is increased without increasing the length in the row direction in the border region and without increasing the number of the touch electrode pins, thereby increasing a distance between adjacent first sub-connection wires in the same layer and reducing a probability that adjacent first sub-connection wires are shorted.

In a case that different groups of first sub-connection wires are arranged in different layers, in an embodiment of the present invention, at least one group of first sub-connection wires are arranged in a same layer as the touch electrode wires, and at least one group of first sub-connection wires are arranged in a same layer as the data lines; in another embodiment of the present invention, at least one group of first sub-connection wires are arranged in a same layer as the touch electrode wires, and at least one group of first sub-connection wires are arranged in a same layer as the scanning lines; and in yet another embodiment of the present invention, at least one group of first sub-connection wires are arranged in a same layer as the data lines, and at least one group of first sub-connection wires are arranged in a same layer as the scanning lines, so as to further simplify the process for fabricating the touch display panel and reduce the thickness of the resulting touch display panel.

In a case that the first connection wires include at least three groups of first sub-connection wires, in another embodiment of the present invention, at least one group of first sub-connection wires are arranged in a same layer as the touch electrode wires, at least one group of first sub-connection wires are arranged in a same layer as the data lines, and at least one group of first sub-connection wires are arranged in a same layer as the scanning lines. This is not intended to be limiting, and the present disclosure will be implemented as appropriate.

Optionally, in the above embodiment, in a case that some of the first sub-connection wires are arranged in a same layer as the data lines and some of the first sub-connection wires are arranged in a same layer as the scanning lines, vertical projections of the first sub-connection wires arranged in the same layer as the data lines on the first substrate do not overlap with vertical projections of the first sub-connection wires arranged in the same layer as the scanning lines on the first substrate, so as to reduce mutual influence between first sub-connection wires arranged in different layers.

Based on any one of the above embodiments, in an embodiment of the present invention, at least one group of second sub-connection wires are arranged in a same layer as the data lines; in another embodiment of the present invention, at least one group of second sub-connection wires are arranged in a same layer as the scanning lines; and in yet another embodiment of the present invention, at least one group of second sub-connection wires are arranged in a same layer as the touch electrode wires, so as to simplify the process for fabricating the touch display panel and reduce the thickness of the resulting touch display panel.

It should be noted that, in a case that the second connection wires include at least two groups of second sub-connection wires, different groups of second sub-connection wires may be arranged in a same layer, so as to simplify the process for fabricating the touch display panel. Alternatively, different groups of second sub-connection wires may be arranged in different layers. In this case, the multiple data line pins are arranged in different layers, such that a distance between adjacent data line pins in the same layer is increased without increasing the length in the row direction in the border region and without increasing the number of data line pins, thereby increasing a distance between adjacent second-sub connection wires in the same layer and reducing a probability that adjacent second sub-connection wires are shorted.

In a case that different groups of second sub-connection wires are arranged in different layers, in an embodiment of the present invention, at least one group of second sub-connection wires are arranged in a same layer as the touch electrode wires, and at least one group of second sub-connection wires are arranged in a same layer as the data lines; in another embodiment of the present invention, at least one group of second sub-connection wires are arranged in a same layer as the touch electrode wires, and at least one group of second sub-connection wires are arranged in a same layer as the scanning lines; and in yet another embodiment of the present invention, at least one group of second sub-connection wires are arranged in a same layer as the data lines, and at least one group of second sub-connection wires are arranged in a same layer as the scanning lines, so as to further simplify the process for fabricating the touch display panel and reducing the thickness of the resulting touch display panel.

In a case that the second connection wires include at least three groups of second sub-connection wires, in another embodiment of the present invention, at least one group of second sub-connection wires are arranged in a same layer as the touch electrode wires, at least one group of second sub-connection wires are arranged in a same layer as the data lines, and at least one group of second sub-connection wires are arranged in a same layer as the scanning lines. However, this is not intended to be limiting, and the arrangements of the second sub-connection wires may be implemented according to specific circumstances of the applications.

Optionally, in the above embodiment, in a case that some of the second sub-connection wires are arranged in a same layer as the data lines and some of the second sub-connection wires are arranged in a same layer as the scanning lines, vertical projections of the second sub-connection wires arranged in a same layer as the data lines on the first substrate do not overlap with vertical projections of the second sub-connection wires arranged in a same layer as the scanning lines on the first substrate, so as to reduce mutual influence between the second sub-connection wires arranged in different layers.

In any one of the above embodiments, in a case that the first sub-connection wire is arranged in a different layer from the touch electrode pin electrically connected to the first sub-connection wire, optionally, the first sub-connection wire is electrically connected to a respective touch electrode pin via a first connection structure.

Figure 7:
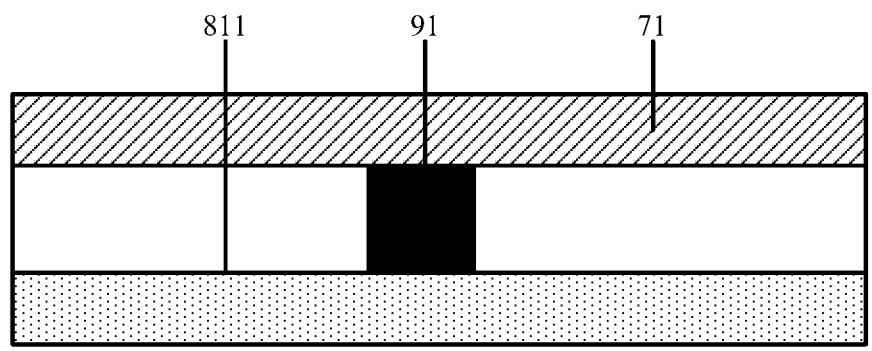
FIG. 7 is a schematic structural diagram of a first connection structure in a touch display panel according to an embodiment of the present invention.
Figure 8:
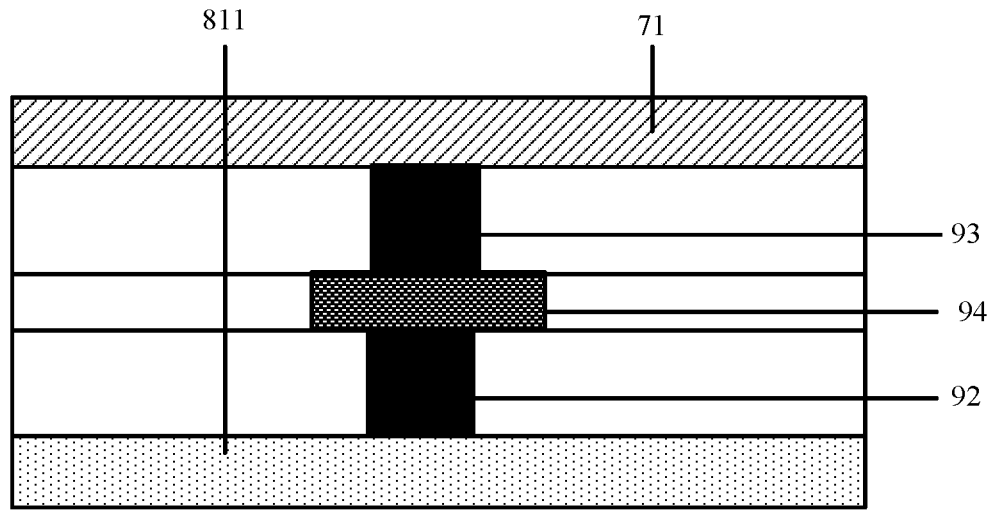
FIG. 8 is a schematic structural diagram of a first connection structure in a touch display panel according to another embodiment of the present invention.

Referring to FIG. 7, FIG. 7 is a schematic structural diagram of a first connection structure according to an embodiment of the present disclosure. In an embodiment of the present disclosure, the first connection structure includes a first via hole 91, with one end of the first via hole 91 being electrically connected to the first sub-connection wire 811 directly, and the other end of the first via hole 91 being electrically connected to the touch electrode pin 71 directly. Referring to FIG. 8, FIG. 8 is a schematic structural diagram of a first connection structure according to another embodiment of the present disclosure. In an embodiment of the present disclosure, the first connection structure includes a third via hole 92, a fourth via hole 93 and a first transition wire 94 arranged between the third via hole 92 and the fourth via hole 93, with a first end of the third via hole 92 being electrically connected to the first sub-connection wire 811 directly, a second end of the fourth via hole 93 being electrically connected to the touch electrode pin 71 directly, and a second end of the third via hole 92 being electrically connected to a first end of the fourth via hole 93 via the first transition wire 94. This is not intended to be limiting, and the present disclosure will be implemented as appropriate.

It should be noted that, in a case that the first connection structure includes the first via hole, optionally, there is only one insulation layer between the first sub-connection wire and the touch electrode pin corresponding to the first sub-connection wire. In a case that the first connection structure includes the third via hole, the fourth via hole and the first transition wire arranged between the third via hole and the fourth via hole, optionally, there are two insulation layers between the first sub-connection wire and the touch electrode pin corresponding to the first sub-connection wire, which is not intended to be limiting the present disclosure, as long as the first sub-connection wire can be electrically connected to the touch electrode pin corresponding to the first sub-connection wire via the first connection structure.

Figure 9:
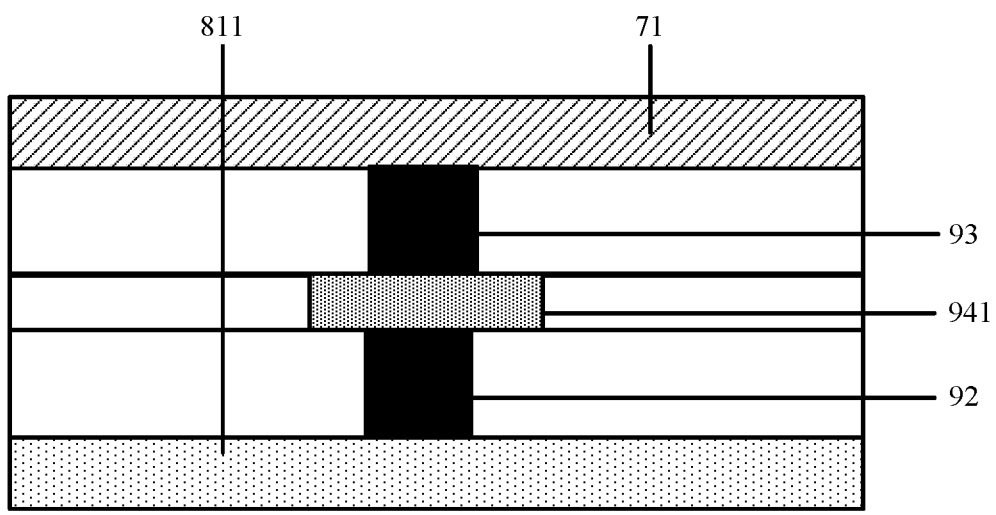
FIG. 9 is a schematic structural diagram of a first transition wire in a touch display panel according to an embodiment of the present invention.
Figure 10:
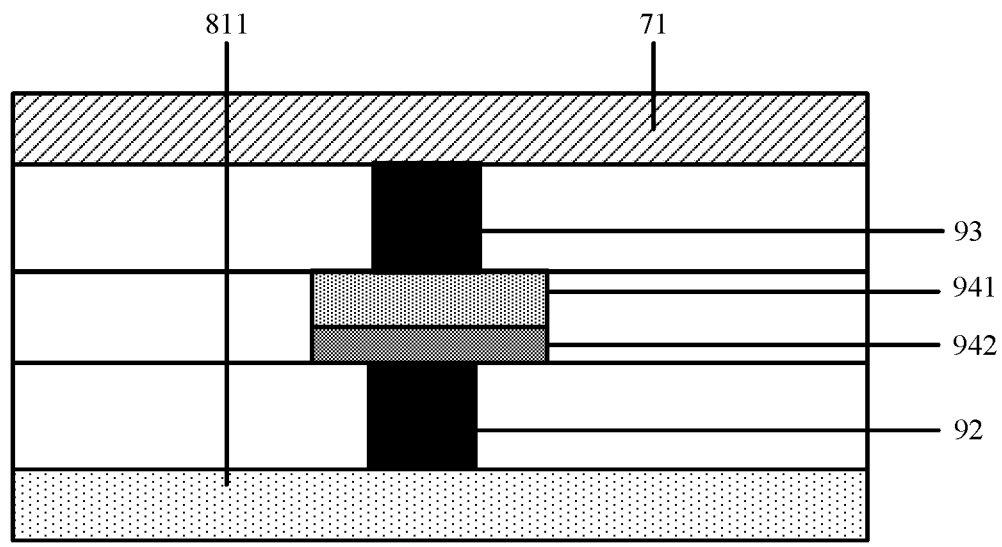
FIG. 10 is a schematic structural diagram of a first transition wire in a touch display panel according to another embodiment of the present invention.

It should be noted that, in a case that the first connection structure includes the third via hole, the fourth via hole and the first transition wire arranged between the third via hole and the fourth via hole, as shown in FIG. 9 and FIG. 10 which show schematic structural diagrams of the first transition wire 94 according to different embodiments of the present disclosure, in the embodiment, the first transition wire 94 may be a metal wire 941 as shown in FIG. 9, or may include a metal wire 941 and an Indium Tin Oxide wire 942 which are stacked up as shown in FIG. 10. A position of the metal wire 941 and a position of the Indium Tin Oxide wire 942 may be exchanged, which is not intended to be limiting the present disclosure, as long as the third via hole 92 and the fourth via hole 93 can be electrically connected to each other.

Optionally, in the above embodiment, in a case that the first sub-connection wire is arranged in a different layer from the touch electrode wire, the metal wire is arranged in a same layer as the touch electrode wire.

Similarly, in any one of the above embodiments, in a case that the second sub-connection wire is arranged in a different layer from the data line pin electrically connected to the second sub-connection wire, the second sub-connection wire is electrically connected, via a second connection structure, to the data line pin electrically connected to the second sub-connection wire.

In an embodiment of the present invention, the second connection structure includes a second via hole, with one end of the second via hole being electrically connected to the data line directly, and the other end of second via hole being electrically connected to the data line pin directly. In another embodiment of the present invention, the second connection structure includes a fifth via hole, a sixth via hole and a second transition wire arranged between the fifth via hole and the sixth via hole, with a first end of the fifth via hole being electrically connected to the second sub-connection wire directly, a second end of the sixth via hole being electrically connected to the data line pin directly, and a second end of the fifth via hole being electrically connected to a first end of the sixth via hole via the second transition wire. This is not intended to be limiting, and the present disclosure will be implemented as appropriate.

It should be noted that, in a case that the second connection structure includes the second via hole, optionally, there is only one insulation layer between the second sub-connection wire and the data line pin corresponding to the second sub-connection wire. In a case that the second connection structure includes the fifth via hole, the sixth via hole and the second transition wire arranged between the fifth via hole and the sixth via hole, optionally, there are two insulation layers between the second sub-connection wire and the data line pin corresponding to the second sub-connection wire, which is not intended to be limiting the present disclosure, as long as the second sub-connection wire can be electrically connected to the data line pin corresponding to the second sub-connection wire via the second connection structure.

It should be noted that, in a case that the second connection structure includes the fifth via hole, the sixth via hole and the second transition wire arranged between the fifth via hole and the sixth via hole, the second transition wire may be a metal wire, or may include a metal wire and an Indium Tin Oxide wire which are stacked up, which is not intended to be limiting the present disclosure, as long as the fifth via hole and the sixth via hole can be electrically connected to each other via the second connection structure.

Optionally, in the above embodiment, in a case that the second sub-connection wire is arranged in a different layer from the touch electrode wire, the metal wire is arranged in a same layer as the touch electrode wire.

Based on any one of the above embodiments, in an embodiment of the present invention, the touch display panel may further include an organic membrane layer arranged in the display region on the first side of the first substrate. The organic membrane layer covers the data lines, the scanning lines and the touch electrode wires and so on, functioning as a planarization layer on the first side of the first substrate.

It should be noted that, in any one of the above embodiments, a display function and a touch function of the touch display panel may be achieved simultaneously or in a time-division manner. This is not intended to be limiting, and the present disclosure will be implemented as appropriate. Optionally, in a specific embodiment of the present invention, the display function and the touch function of the touch display panel are achieved in a time-division manner. The touch electrode is reused as a common electrode in a display phase, to further reduce the thickness of the resulting touch display panel, thereby fabricate development of a lighter and thinner touch display panel.

Specifically, in the display phase, touch electrodes corresponding to respective display pixels are reused as common electrodes having a same voltage signal, i.e., a common voltage signal. The scanning lines control thin film transistors corresponding to respective display pixels to be switched on or switched off. In a case that the thin film transistor is switched on, a data signal in the data line is transmitted to a pixel electrode of a display pixel electrically connected to the thin film transistor via a drain of the thin film transistor, thereby generating a control electric field between the pixel electrode and the touch electrode to control displaying of the display pixels. In a touch phase, the thin film transistors corresponding to the display pixels are switched off, and touch signals are applied on respective touch electrodes; and when the touch display panel is touched, the touch is detected by detecting a change in voltage signals at the touch electrodes.

It should be noted that, in the touch display panel according to the embodiment of the present invention, shapes and arrangements of the touch electrodes are not limited to those shown in FIG. 3, and the plan view of the touch electrodes shown in FIG. 3 should not be understood as limitation to the embodiment of the present invention.

Figure 11:
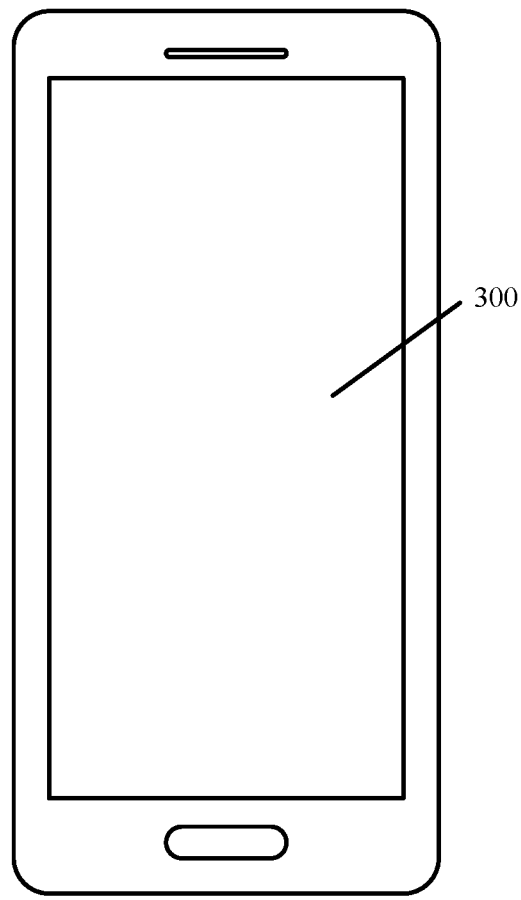
FIG. 11 is a schematic structural diagram of a touch display device according to an embodiment of the present invention.

In addition, as shown in FIG. 11, it is further provided a touch display device according to an embodiment of the present invention. The touch display device includes a touch display panel 300 which may be the touch display panel according to any one of the above embodiments of the present invention.

In summary, the touch display panel according to the embodiment of the present invention and the touch display device including the touch display panel include multiple data line pins and multiple touch electrode pins arranged in the border region on the first side of the first substrate, and the first connection wires and the second connection wires arranged in the border region on the first side of the first substrate. The first connection wires electrically connect the touch electrode pins and the touch electrode wires, and the second connection wires electrically connect the data line pins and the data lines. The touch electrode pins are arranged in different rows from the data line pins, such that a distance between adjacent touch electrode pins is increased without increasing the length in the row direction in the border region and without increasing the number of the touch electrode pins, thereby increasing a distance between the first connection wires electrically connected to the touch electrode pins, and reducing a probability that the first connection wires electrically connected to adjacent touch electrode pins are shorted.

Various parts of the specification are described in a progressive manner and each part lays emphasis on differences from other parts. The same or similar content between various parts may be referred to each other.

The above description of the disclosed embodiments can enable those skilled in the art to implement or use the present disclosure. Multiple changes to the embodiments are obvious for those skilled in the art and general principles defined herein can be implemented in other embodiments without departing from the spirit or scope of the present disclosure. Therefore, the present disclosure is not limited to the embodiments described herein, but conforms to the widest scope in accordance with principles and novel features disclosed herein.

The invention claimed is:

1. A touch display panel, comprising a display region and a border region, the touch display panel comprising:
a first substrate;
a plurality of data lines and a plurality of scanning lines which are arranged in the display region on a first side of the first substrate and are arranged to be insulatively intersected with each other, wherein the plurality of data lines and the plurality of scanning lines define a plurality of display pixels;
a plurality of touch electrodes arranged in the display region on the first side of the first substrate and touch electrode wires electrically connected to the plurality of touch electrodes;
a plurality of first pins arranged in the border region on the first side of the first substrate, wherein the plurality of first pins comprise a plurality of data line pins and a plurality of touch electrode pins, wherein the plurality of data line pins are grouped into M rows, the data line pins in a same row are arranged in parallel in a direction of the row, a plurality of second connection wires comprise M groups of a plurality of second sub-connection wires, and one group of the second sub-connection wires are electrically connected to one row of the data line pins, where M is a positive integer greater than or equal to 1, and wherein the plurality of touch electrode pins are grouped into N rows, the touch electrode pins in a same row are arranged in parallel in a direction of the row, a plurality of first connection wires comprise N groups of a plurality of first sub-connection wires, and one group of the first sub-connection wires are electrically connected to one row of the touch electrode pins, where N is a positive integer greater than or equal to 1; and
the first connection wires and the second connection wires arranged in the border region on the first side of the first substrate, wherein the first connection wires electrically connect the plurality of touch electrode pins and the touch electrode wires via a first connection structure, and the second connection wires electrically connect the plurality of data line pins and the plurality of data lines via a second connection structure,
wherein the first connection structure comprises a first via hole, a second via hole and a first transition wire arranged between the first via hole and the second via hole, with a first end of the first via hole being electrically connected to the first sub-connection wire directly, a second end of the second via hole being electrically connected to the touch electrode pin directly, and a second end of the first via hole and a first end of the second via hole being electrically connected to each other via the first transition wire, and
wherein the touch electrode pins are arranged in different rows from the data line pins.

2. The touch display panel according to claim 1, wherein projections of the plurality of touch electrode pins do not coincide exactly with projections of the plurality of data line pins in a direction perpendicular to a direction of the row.

3. The touch display panel according to claim 1, wherein a same group of the first sub-connection wires are arranged in a same layer, and a same group of the second sub-connection wires are arranged in a same layer.

4. The touch display panel according to claim 3, wherein at least one group of the first sub-connection wires are arranged in a same layer as the touch electrode wires, at least one group of the first sub-connection wires are arranged in a same layer as the plurality of data lines, or at least one group of the first sub-connection wires are arranged in a same layer as the plurality of scanning lines.

5. The touch display panel according to claim 4, wherein different groups of the first sub-connection wires are arranged in a same layer in a case that the first connection wires comprise at least two groups of the first sub-connection wires.

6. The touch display panel according to claim 3 wherein at least one group of the second sub-connection wires are arranged in a same layer as the plurality of data lines, the plurality of scanning lines or the touch electrode wires.

7. The touch display panel according to claim 6, wherein different groups of the second sub-connection wires are arranged in different layers in a case that the second connection wires comprise at least two groups of the second sub-connection wires.

8. The touch display panel according to claim 7, wherein in a case that some of the second sub-connection wires are arranged in a same layer as the plurality of data lines and some of the second sub-connection wires are arranged in a same layer as the plurality of scanning lines, vertical projections of the second sub-connection wires arranged in a same layer as the plurality of data lines on the first substrate do not overlap with vertical projections of the sub-connection wires arranged in a same layer as the plurality of scanning lines on the first substrate.

9. The touch display panel according to claim 1, wherein the first connection structure comprises a third via hole, with one end of the third via hole being electrically connected to the first sub-connection wire directly and the other end of the third via hole being electrically connected to the touch electrode pin directly, and/or wherein the second connection structure comprises a fourth via hole, with one end of the fourth via hole being electrically connected to the data line directly and the other end of the fourth via hole being electrically connected to the data line pin directly.

10. The touch display panel according to claim 1, wherein the second connection structure comprises a third via hole, a fourth via hole and a second transition wire arranged between the third via hole and the fourth via hole, with a first end of the third via hole being electrically connected to the second sub-connection wire directly, a second end of the fourth via hole being electrically connected to the data line pin directly, and a second end of the third via hole and a first end of the fourth via hole being electrically connected to each other via the second transition wire.

11. The touch display panel according to claim 10, wherein the first transition wire or the second transition wire is a metal wire, or comprises a metal wire and an indium tin oxide (ITO) wire which are stacked up.

12. The touch display panel according to claim 11, wherein the metal wires are arranged in a same layer as the touch electrode wires in a case that the first transition wires or the second sub-connection wires are arranged in different layers from the touch electrode wires.

13. The touch display panel according to claim 1, wherein the plurality of touch electrodes are reused as a plurality of common electrodes in a display phase.

14. A touch display device, comprising a touch display panel, the touch display panel comprising a display region and a border region, the touch display panel comprising:
a first substrate;
a plurality of data lines and a plurality of scanning lines which are arranged in the display region on a first side of the first substrate and are arranged to be insulatively intersected with each other, wherein the plurality of data lines and the plurality of scanning lines define a plurality of display pixels;
a plurality of touch electrodes arranged in the display region on the first side of the first substrate and touch electrode wires electrically connected to the plurality of touch electrodes;
a plurality of first pins arranged in the border region on the first side of the first substrate, wherein the plurality of first pins comprise a plurality of data line pins and a plurality of touch electrode pins, wherein the plurality of data line pins are grouped into M rows, the data line pins in a same row are arranged in parallel in a direction of the row, a plurality of second connection wires comprise M groups of a plurality of second sub-connection wires, and one group of the second sub-connection wires are electrically connected to one row of the data line pins, where M is a positive integer greater than or equal to 1, and wherein the plurality of touch electrode pins are grouped into N rows, the touch electrode pins in a same row are arranged in parallel in a direction of the row, a plurality of first connection wires comprise N groups of a plurality of first sub-connection wires, and one group of the first sub-connection wires are electrically connected to one row of the touch electrode pins, where N is a positive integer greater than or equal to 1; and
the first connection wires and the second connection wires arranged in the border region on the first side of the first substrate, wherein the first connection wires electrically connect the plurality of touch electrode pins and the touch electrode wires via a first connection structure, and the second connection wires electrically connect the plurality of data line pins and the plurality of data lines via a second connection structure,
wherein the first connection structure comprises a first via hole, a second via hole and a first transition wire arranged between the first via hole and the second via hole, with a first end of the first via hole being electrically connected to the first sub-connection wire directly, a second end of the second via hole being electrically connected to the touch electrode pin directly, and a second end of the first via hole and a first end of the second via hole being electrically connected to each other via the first transition wire, and
wherein the touch electrode pins are arranged in different rows from the data line pins.

15. A touch display panel, comprising a display region and a border region, the touch display panel comprising:
a first substrate;
a plurality of data lines and a plurality of scanning lines which are arranged in the display region on a first side of the first substrate and are arranged to be insulatively intersected with each other, wherein the plurality of data lines and the plurality of scanning lines define a plurality of display pixels;
a plurality of touch electrodes arranged in the display region on the first side of the first substrate and touch electrode wires electrically connected to the plurality of touch electrodes;
a plurality of first pins arranged in the border region on the first side of the first substrate, wherein the plurality of first pins comprise a plurality of data line pins and a plurality of touch electrode pins, wherein the plurality of data line pins are grouped into M rows, the data line pins in a same row are arranged in parallel in a direction of the row a plurality of second connection wires comprise M groups of a plurality of second sub-connection wires, and one group of the second sub-connection wires are electrically connected to one row of the data line pins, where M is a positive integer greater than or equal to 1, and wherein the plurality of touch electrode pins are grouped into N rows, the touch electrode pins in a same row are arranged in parallel in a direction of the row, a plurality of first connection wires comprise N groups of a plurality of first sub-connection wires, and one group of the first sub-connection wires are electrically connected to one row of the touch electrode pins, where N is a positive integer greater than or equal to 1; and the first connection wires and the second connection wires arranged in the border region on the first side of the first substrate, wherein the first connection wires electrically connect the plurality of touch electrode pins and the touch electrode wires via a first connection structure, and the second connection wires electrically connect the plurality of data line pins and the plurality of data lines via a second connection structure, wherein the second connection structure comprises a first via hole, a second via hole and a first transition wire arranged between the first via hole and the second via hole, with a first end of the first via hole being electrically connected to the second sub-connection wire directly, a second end of the second via hole being electrically connected to the data line pin directly, and a second end of the first via hole and a first end of the second via hole being electrically connected to each other via the first transition wire, and wherein the touch electrode pins are arranged in different rows from the data line pins.

* * * * *